(12) United States Patent  
Klemp

(10) Patent No.: US 6,564,630 B1  
(45) Date of Patent: May 20, 2003

(54) METHOD FOR MEASURING LEVEL AND LEVEL SENSOR

(75) Inventor: Heinz Klemp, Isernhagen (DE)

(73) Assignee: sci-worx GmbH, Hannover (DE)

( * ) Notice: Subject to any disclaimer, the term of this patent is extended or adjusted under 35 U.S.C. 154(b) by 0 days.

(21) Appl. No.: 09/959,051

(22) PCT Filed: Feb. 19, 2000

(86) PCT No.: PCT/DE00/00475  
§ 371 (c)(1),  
(2), (4) Date: Oct. 15, 2001

(87) PCT Pub. No.: WO00/63657  
PCT Pub. Date: Oct. 26, 2000

(30) Foreign Application Priority Data

Apr. 15, 1999 (DE) .......................................... 199 16 979

(51) Int. Cl.⁷ .......................... G01F 23/26; G01F 23/00  
(52) U.S. Cl. .................. 73/304 C; 73/304 R; 73/290 R  
(58) Field of Search .......................... 73/290 R, 304 C, 73/304 R

(56) References Cited

U.S. PATENT DOCUMENTS 5,437,184 A * 8/1995 Shillady .................... 73/304 C

FOREIGN PATENT DOCUMENTS

| GB | 2304418 | 3/1997 | ............ G01C/9/06 |
| WO | WO 96/33393 | 10/1996 | ............ G01F/23/26 |

* cited by examiner

Primary Examiner—Helen Kwok  
Assistant Examiner—Rodney Frank  
(74) Attorney, Agent, or Firm—Richard E. Backus

(57) ABSTRACT

A method for measuring level with a plurality of capacitive sensors arranged next to each other along a filling section. The method steps are: subjecting a sensor to a measuring signal and subjecting an adjacent sensor to a phase-displaced measuring signal. Then the resulting signals on the sensors are measured. Next the phase displacement between the resulting signals is determined. Then the level is established in accordance with the phase displacement.

13 Claims, 2 Drawing Sheets

METHOD FOR MEASURING LEVEL AND LEVEL SENSOR

Figure 1:
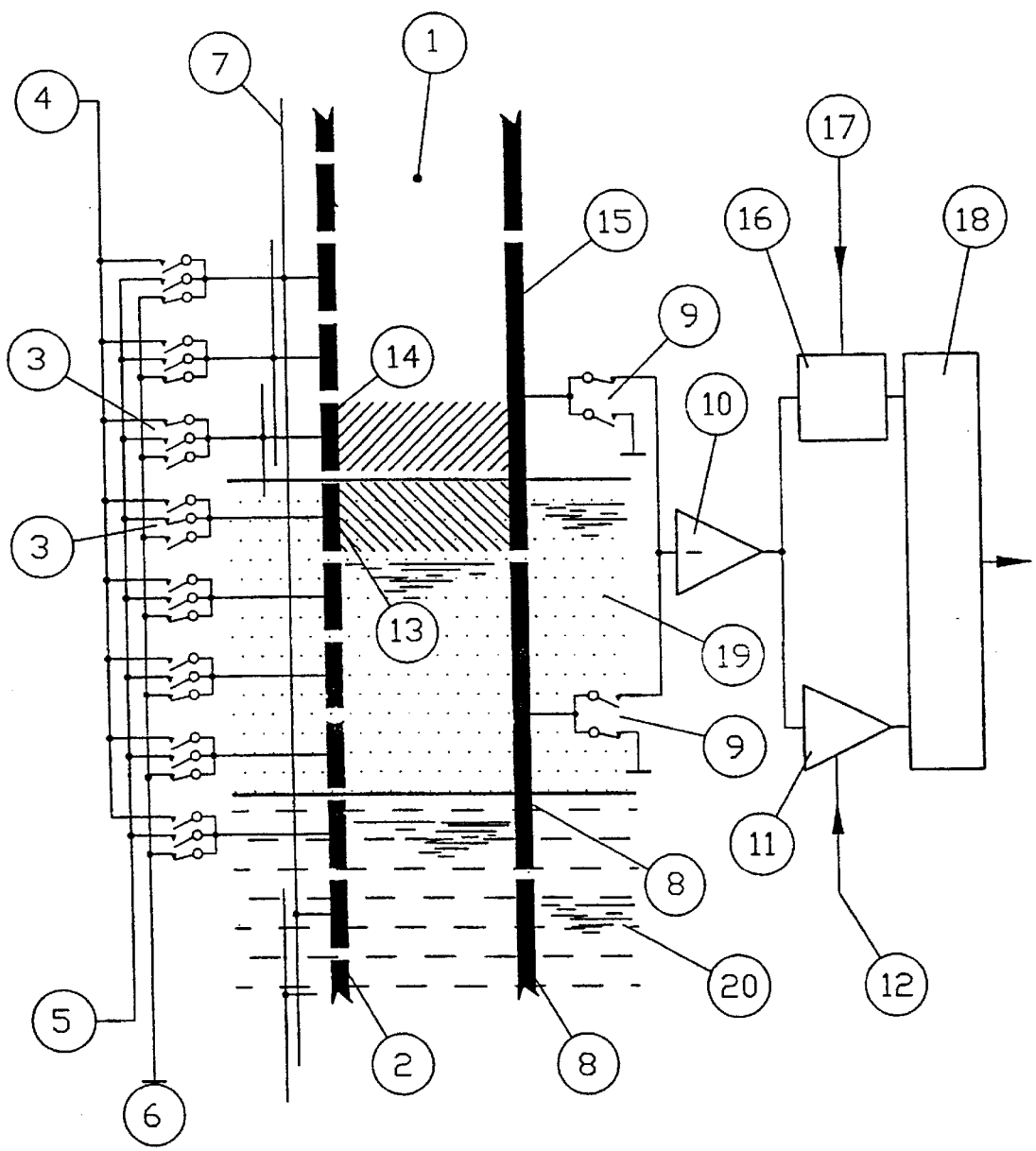

The invention is in regard to a process for measuring liquid levels as well as to a liquid level sensor with a number of capacitive sensors arranged side-by-side along the filling range of a tank, and consisting of field electrodes and measuring electrodes located diametrically opposite to each other.

Liquid level measuring sensors are particularly useful in gas tanks as, for example, in gas tanks of motor vehicles and motorcycles. For safety reasons, gas tanks are frequently given an irregular shape, which limits the use of traditional potentiometer sensors. The resolution and accuracy of potentiometer sensors in residual.quantities or in full tanks have limitations. In addition, potentiometer sensors are susceptible to wear and tear and may break down for mechanical reasons.

Also known, as an alternative to potentiometer sensors, are the capacitive sensors. For example, DE-AS 22 21 741 and DE-PS 25 15 065 describe liquid level sensors with a bank of capacitors positioned one above the other along a filling range of a tank to which an impulse voltage is applied at the capacitors' field electrodes. The measuring electrodes are connected to a differential amplifier. The dielectric constant of the medium in which the liquid level sensor is submerged influences the capacitor's capacitance. In DE-AS 22 21 741, two neighboring capacitors of the same capacitance form one differential capacitor. To the differential capacitors, impulse signals are injected at their common electrodes, and the differential amplifier's exit signal equals zero if both capacitors belonging to one and the same differential capacitor are located in the same medium. Correspondingly, the differential signal is other than zero when the two capacitors are located in different media. The differential amplifier's exit signal Is connected to an impulse counter and the number of the impulses other than zero becomes the measurement of the liquid level.

This arrangement has the disadvantage that the two capacitors forming one differential capacitor must possess the exact same capacitance. DE-OS 49 37 927 describes an arrangement for measuring liquid levels in which the capacitors are combined first into one group, and then into at least one further group. Each group contains two sub-groups of parallel-wired capacitors. Two capacitors of the same group positioned next to each other along the direction of the filling range have approximately the same capacities if the dielectric constant is the same. The sub-groups belonging to the same group are each connected to a common comparator unit, which forms a digital comparison signal in relation to the difference of the resulting capacities of the sub-groups. The reference value for the resulting capacity of one sub-group is the resulting capacity of another sub-group. In that manner, same-direction aging and environmental influences can be compensated for.

The disadvantage of this arrangement is that the capacitors must have the exact same capacities. In addition, problems arise from parasitical stray capacitance because each impulse addresses an entire row of capacitors, which influence mutually each other.

In DE-PS 31 14 678 a liquid level indicator is described, in which several measuring electrodes are combined section ally and connected to an evaluation circuit. The sensor elements have one single back plate. The capacitors located below the level of a liquid are wired parallel by the liquid's dielectric and the resulting capacity becomes the measure for the liquid's level. Therefore, a reference value is necessary to convert the measured capacity into a proportional liquid level. The reference value is dependent on the medium that is to be measured and must be newly calibrated each time the container is filled. In addition, stray capacitance occurs between the back plate and the measuring electrodes and between the measuring electrodes themselves.

The DE-OS 39 26 218 A1 shows a liquid level measuring arrangement in which the level can be determined in homogeneously distributed media without a reference value. To accomplish this, the measuring electrodes are connected.

Individually to a comparison unit and evaluated cyclically and sequentially. In doing so, each value is compared in a comparator to a reference value, which is the same for capacitors of the same size. There is only one back plate involved and the container wall can be used for this back plate.

In DE-PS 196 44 777 C1 a liquid level sensor is described in which the measuring electrodes of the capacitive sensors are connected to a liquid level evaluation circuit in a way that allows them to be triggered individually. In each field, the back plates of a respective group of capacitive sensors are interconnected with one field electrode, and the field electrodes of each of the fields are connected with the liquid level evaluation circuit in an individually selective manner. By subdividing the usually single back plates into a number of field electrodes, the problem of stray capacitance is thus reduced.

Frequently, water is found on the bottom of the tank that has collected there. In addition, the medium's dielectric constant may vary. This may cause measurement errors with the above-mentioned liquid level sensors.

The problem of the invention was, therefore, to provide an improved process for measuring liquid levels, with a number of capacitive sensors arranged side-by-side along a filling range as well as a liquid level sensor by which the level can be determined in a simple and reliable manner, even when the tank is used for unknown or varying media.

The following steps solve the problem of the invention:
An impulse current generator for a field electrode with a measuring signal and a neighboring field electrode with a phase-displacement measuring signal,
Measurement of a resulting signal at the individual measuring electrodes,
Determination of the resulting signal's phase displacement in relation to a reference signal, and
Determination of the level in relation to the phase displacement.

When, for example, two measuring signals of opposing phases are simultaneously applied to the capacitive sensors, the signals cancel each other out when the sensors in question are positioned in the same medium. It is advantageous, in this respect, that the measuring signals are in phase opposition, that is, in a 180° phase displacement. In addition, a signal is always applied to two sensors. As long as the sensors are positioned in a medium with a dielectric constant of E<>1, the two signals in the phase become compensatory—even if the media vary.

When one of the sensors is in air and the dielectric constant E=1, a phase displacement occurs in the compound signal which is made up of the sum of the two phase-opposed measuring signals. The level height can be determined by the phase-displacement.

In order to avoid parasitic stray capacitances, it is advantageous to connect the sensors, to which no measuring signal is being applied, to a mass potential. For this purpose, each of the measuring electrodes can have a change-over switch, by means of which it can be connected either to a measure signal, to the phase-opposed measuring signal, or to the mass potential. The switches can be controlled by a microprocessor, for example.

It is advantageous to apply impulse signals to the sensors along the filling range sequentially and continuously, so that the filling range is scanned continuously.

The resulting signals at the sensors' measuring electrodes are advantageously amplified by a summing amplifier and led to a phase comparator for measuring the phase displacement.

In addition, it is particularly advantageous to determine the amplitude of the compound signal. By comparing it to the reference signal, it is possible to determine the medium surrounding the respective measuring electrode.

In order to avoid parasitical stray capacitance, it is also advantageous to connect the measuring electrodes selectively to the summing amplifier or a mass potential through a switch. These switches can again be controlled by a microprocessor.

It has been found to be of particular-advantage to provide for a great number of field electrodes to which measuring signals can be applied respectively. The resulting signal should be measured at the measuring electrodes whereby several field electrodes are provided for each measuring electrode. It is particularly advantageous if four field electrodes each work together with one measuring electrode.

Figure 2:
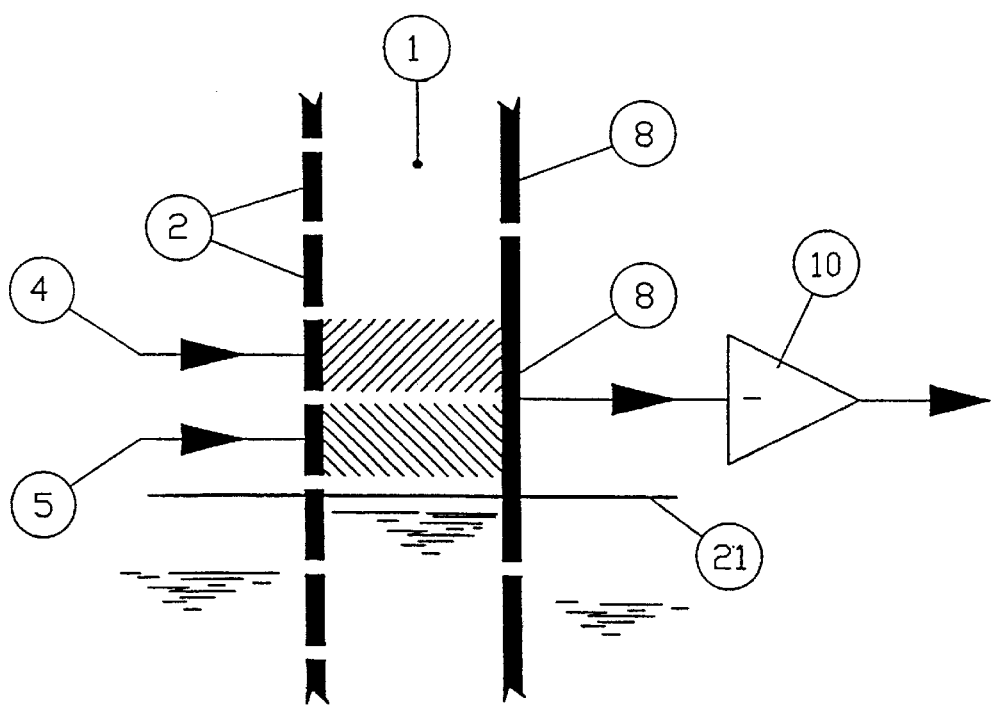
Figure 3:
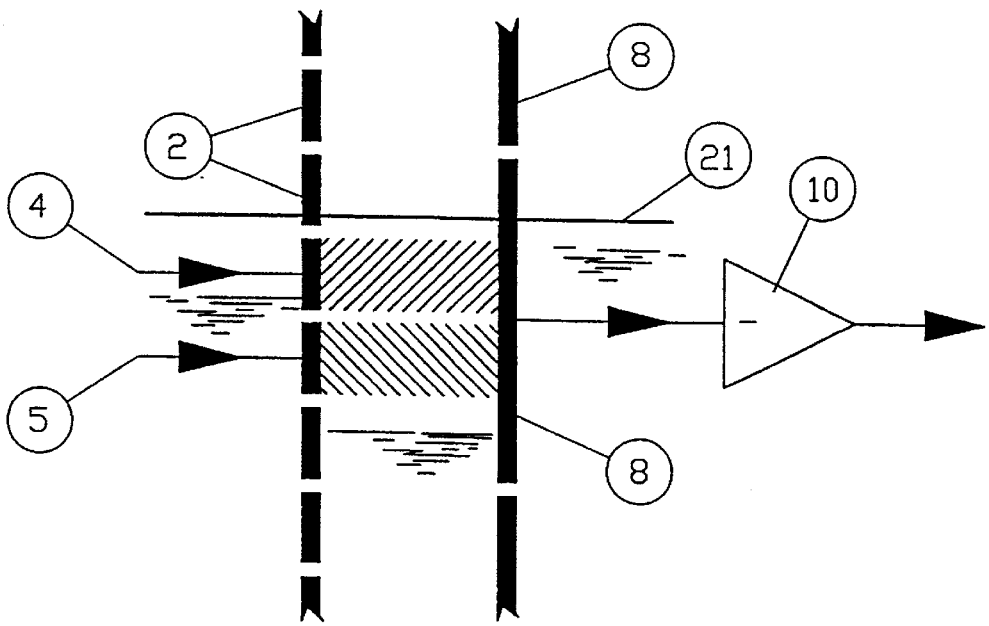

The invention is explained in more detail by means of the two attached drawings:

FIG. 1 Block diagram of the liquid level sensors with phase and amplitude comparators;

FIG. 2 Basic circuit diagram of the liquid level sensors with current carrying sensors, which are located above the medium;

FIG. 3 Basic circuit diagram of the liquid level sensors with current carrying sensors, which are submerged in the medium;

FIG. 1 shows a block diagram of the liquid level sensors according to invention. The capacitive sensors 1 are, in essence, formed of a great number of field electrodes 2, which are arranged side-by-side along a filling range for the medium. For each field electrode 2 a switch 3 has been provided by which the field electrode 2 can be selectively connected to a measuring signal 4, to a 180°-phase-displaced measuring signal 5, or a mass potential 6. Alternatively, instead of using one switch 3 per field electrode 2, the field electrodes 2 which are at some distance from each other, can also be connected to a bus line 7 and injected with a measuring signal simultaneously. This has the advantage that the need for wiring and switches is thus reduced.

Diametrically opposed to the field electrodes 2 are the measuring electrodes 8, which, together with the field electrodes 2, act as capacitive sensors 1. For a number of field electrodes 2, one measuring electrode 8 is provided. In the example, one measuring electrode is used for four field electrodes 2. The measuring electrodes 8 are each provided with a switch 9 by which they can be selectively connected to a mass potential or to the summing amplifier 10.

The summing amplifier's 10-exit signal is led into a phase comparator 11 in order to compare the resulting measuring signal with a reference signal 12.

In the diagram of the example, the lower field electrode 13 of the current carrying sensors 1 is located in a medium and the upper field electrode 14 is located in air. Because of the differing dielectric constants of air and medium, a phase displacement occurs in the resulting signal at the measuring electrode located opposite from the two field electrodes 13 and 14. The summing amplifier 10 amplifies the resulting signal, and the phase displacement is recognized as the measure for the liquid's level.

In addition, the summing amplifier is connected to an amplitude comparator 16. It is thus possible to compare the amplitude of the resulting signal with reference amplitude 17, and to determine thus the medium in which the current carrying sensor 1 is located.

The signals resulting from the phase comparator 11 and the amplitude comparator 16 can then be transferred over a traditional interface 18 to a post processor and control computer.

FIG. 1 reveals another problem with traditional tanks. When measuring the liquid level one cannot only recognize the transition from air to a medium, but also a transition between two different media. For example, the tank may contain fuel 19, while at the bottom the tank may contain water. However, since both media are conductive, the measuring signals' phases cancel each other out. Only the amplitude of the resulting summing signal can vary at the transition from conductive media to another conductive media. At the transition of non-conductive air to a conductive medium, however, a phase displacement of the signal in relation to a reference signal 12 occurs, so that the liquid level can be determined.

FIG. 2 shows a basic circuit diagram of the liquid level measuring sensors in which the current carrying sensors 1 are located above the level 11. The two neighboring field electrodes are injected with a measuring signal 4 and a measuring signal 5, which has a 180°-phase-displacement. Following its amplification by the summing Amplifier 10, the resulting signal is evaluated at the measuring electrode 8 located on the opposite side. When both current carrying field electrodes are located in air, the dielectric constant E=1 and no phase displacement occurs at the capacitor formed by the field electrodes 2 and the measuring electrode 8. The resulting signal is therefore zero and shows no phase displacement in relation to the reference signal. It is thereby recognizable that both current carrying field electrodes 2 are located in the same medium.

FIG. 3 shows a basic circuit diagram in which the current carrying transducers are located in the same medium below the liquid level 21. The current carrying field electrodes 2 are injected with a measuring signal 4 and a measuring signal 5, which has a 180°-phase-displacement. Because of the same dielectric constants, the signals cancel each other out, and the respective measuring electrode 8 on the opposite side shows, just like in example 2, that no phase displacement occurred.

If, however, one field electrode 2 is located above the liquid level 21 and the other field electrode 2 is located in the medium below the level, a phase displacement of the resulting measured signal occurs especially then when one of the current carrying field electrodes 2 is only partially submerged in the medium. This phase displacement is measured and the level is thus determined.

The field electrodes 2 along the filling range are injected sequentially and continuously with a measuring signal by using, for example, a multiplexor. As can be seen from the Figures, the surface dimension of the measuring electrode 8 is greater than that of the field electrode 2, so that the signals of several field electrodes 2 can be scanned at the measuring electrode 8, and the received signal is already the summing signal.

What is claimed is:

1. A process for measuring liquid levels with a number of capacitive sensors (1) arranged side-by-side along the filling range of a tank, and comprising a plurality of field electrodes (2) and a plurality of measuring electrodes (8) positioned diametrically opposite to each other, the process characterized by:

injecting a first field electrode (2) with a measuring signal (4) and injecting a second field electrode (2) with a phase-displaced measuring signal (5) sufficient to produce resulting signals, measuring the resulting signals at the respective measuring electrodes (8), determining the phase displacement of the resulting signals in relation to a reference signal 12, and determining the liquid level in relation to the phase displacement.

2. A process according to claim 1, characterized in that the phase displacement between the measuring signal (4) and the phase-displaced measuring signal (5) is 180°.

3. A process according to claim 1, characterized in that the sensors which are not injected with a measuring signal (4) are connected to a mass potential (6).

4. A process according to claim 1, characterized in that a current is applied to the sensors (1) along the filling range sequentially and continuously.

5. A process according to claim 1, characterized by the determination of a medium surrounding the capacitive sensors (1) by summing up resulting current signals and comparing the amplitude of the sum of the signals.

6. A process according to claim 1 and further characterized in that the sensors, which are not injected with a measuring signal, are connected to mass potential (6), wherein a current is applied to the sensors (1) along the filling range sequentially and continuously, and wherein a medium surrounding the capacitive sensors (1) is determined by summing up resulting current signals and comparing the amplitude of the sum of the current signals.

7. A liquid level sensor with a number of capacitive sensors (1) arranged side-by-side along the filling range of a tank, and comprising field electrodes (2) and measuring electrodes (8) positioned diametrically opposite to each other, characterized in that field-electrode switches (3) are provided for connecting selectively certain field electrodes (2) to a measuring signal (4) and to a phase-displaced measuring signal (5), or to a mass potential (6); that a phase comparator (11) for determining the phase displacement between the resulting signals is switchable to the measuring electrodes (8), and that a control unit is provided in order to charge a field electrode (2) with a measuring signal(4) and a neighboring field electrode (2) with a phase-displaced measuring signal (5), and that a processor is provided to determine the liquid level in relation to the phase displacement of the resulting signal at the respective measuring electrodes (8).

8. A liquid level sensor according to claim 7, characterized by the fact that one measuring electrode (8) each is provided for several field electrodes (2).

9. A liquid level sensor according to claim 7, characterized by the fact that four field electrodes (2) are always provided for one measuring electrode (8).

10. A liquid level sensor according to claim 7, characterized in that measuring-electrode switches (9) are provided for the measuring electrodes (8) in order to connect the measuring electrodes (8) selectively with the phase-comparator (11) or a mass potential.

11. A liquid level sensor according to claim 7 characterized in that a summing amplifier (10) is connected between the phase comparator (11) and the measuring electrodes (8).

12. A liquid level sensor according to claim 11 characterized in that an amplitude comparator (16) is connected behind the summing amplifier (10) in order to compare.the signal amplitude with a reference signal (17) and to determine the medium surrounding the capacitive sensors (1).

13. A liquid level sensor with a number of capacitive sensors (1) arranged side-by-side along the filing range of a tank and comprising field electrodes (2) positioned opposite each other, the sensor characterized in that field electrode switches (3) are provided for connecting selected field electrodes (2) to a measuring signal (4) and to a phase-displaced measuring signal (5) or to a mass potential (6); a phase-comparator (11) for determining the phase displacement: between the resulting signals, the phase-comparator being switchable to the measuring electrodes (8), a control unit for charging a field electrode (2) with a measuring signal (4) and a neighboring field electrode (2) with a phase-displaced measuring signal (5), a processor which determines the liquid level in relation to the phase displacement of the resulting signals at the respective measuring electrodes (8), wherein one measuring electrode (8) each is provided for several field electrodes (2), wherein measuring-electrode switches (9) are provided for the measuring electrodes (8) in order to connect the measuring electrodes (8) selectively with the phase-comparator (11) or mass potential, wherein a summing amplifier is connected between the phase-comparator (11) and the measuring electrodes (8), and wherein an amplifier comparator (16) is connected behind the summing amplifier (10) to compare the signal amplitude with a reference signal (17) and to determine the medium surrounding the capacitive sensors (1).

* * * * *